United States Patent [19]

Slow et al.

[11] Patent Number: 5,666,694
[45] Date of Patent: Sep. 16, 1997

[54] HINGE ARRANGEMENT

[75] Inventors: Wee Min Slow; Ting Yeow Hoong; Beng Hong Kang, all of Singapore, Singapore

[73] Assignee: Hewlett-Packard Company, Palo Alto, Calif.

[21] Appl. No.: 535,724

[22] Filed: Sep. 28, 1995

[51] Int. Cl.⁶ ............................................. E05D 15/00
[52] U.S. Cl. ...................... 16/368; 361/681; 16/308; 16/341; 16/342
[58] Field of Search ......................... 16/308, 366, 369, 16/309, 320, 341, 342, 368; 361/681, 682; 364/708.1; 312/223.2

[56] References Cited

U.S. PATENT DOCUMENTS

| 4,330,219 | 5/1982 | Miyasaka et al. | |
|---|---|---|---|
| 4,615,464 | 10/1986 | Byrns | 16/342 |
| 4,825,395 | 4/1989 | Kinser, Jr. et al. | 361/681 |
| 4,846,536 | 7/1989 | Saitou et al. | |
| 4,928,350 | 5/1990 | Morgan | |
| 4,960,256 | 10/1990 | Chihara | 361/681 |
| 4,976,007 | 12/1990 | Lam | |
| 5,231,734 | 8/1993 | Rude | |
| 5,278,725 | 1/1994 | Konno et al. | |
| 5,282,293 | 2/1994 | Pedoeem | 16/366 |
| 5,555,157 | 9/1996 | Moller et al. | 312/223.2 |

FOREIGN PATENT DOCUMENTS

| 111818 | 12/1928 | Austria | 16/366 |
|---|---|---|---|
| 0550909A1 | 7/1993 | European Pat. Off. | |
| 2033956 | 5/1980 | United Kingdom | |
| WO93/01700 | 1/1993 | WIPO | |
| WO95/00406 | 1/1995 | WIPO | |

Primary Examiner—Chuck Y. Mah
Assistant Examiner—Mark Williams

[57] ABSTRACT

A hinge arrangement having first and second hinges is provided, each hinge being operable upon application of a different torque. The first hinge operates upon application of a first torque to pivot a structure through a first range of motion, beyond which the first hinge is opposed by a relatively high restrictive force. The second hinge operates upon application of a second torque which is greater than the first torque, but insufficient to overcome the restrictive force. Upon applying the second torque, the structure is pivotable through a second range of motion. The hinges thus work cooperatively to pivotally couple first and second panels (or structures) of a clamshell-like device.

16 Claims, 4 Drawing Sheets

5,666,694

HINGE ARRANGEMENT

TECHNICAL FIELD

The present invention relates generally to hinges arrangements, and more particularly, to a hinge arrangement having first and second hinges which operate selectively to pivot a cover panel relative to a base panel in a clamshell-like device. Although the invention has broad utility, it is described below in the context of a handheld computer organizer, a device wherein particular utility has been shown.

BACKGROUND ART

There has, in recent years, been an explosion in the desire for computer organizers, and more particularly, in the desire for handheld computer organizers which offer features similar both to desktop computers and to paper and pen. These organizers typically include a keyboard and a display screen, the display screen being configured to accept input from a pen-like stylus which allows the user to draw images on the display screen. Such organizers often are embodied in clamshell-like devices, meaning that the device includes a base panel and a cover panel which pivots relative to the base panel to open or close the device. The base panel typically defines the keyboard. The cover panel typically defines the display screen. A single organizer thus may be operated either as a desktop computer (employing both the keyboard and display screen), or as a note pad (employing only the display screen) on which images may be drawn using the stylus.

Handheld computer organizers thus optimally are configured for use either in a "landscape orientation" where the display screen and keyboard both are accessible to the user, or in a "portrait orientation" where the cover panel is folded back against the base panel to expose the display screen alone. Similarly, base and cover panels are oppositely foldable to provide a clamshell-like device which may be fully opened or fully closed. This requires pivot of the cover panel relative to the base panel through 360-degrees of motion, a task which often is made difficult by the thickness of the base and cover panels. Until now, such pivot has been accomplished using complicated linkage arrangements which require multiple user manipulations. These arrangements typically have involved the use of hinges, such hinges often being housed in slots which require adjustment of the hinge position in order to achieve the full range of motion of the cover panel. Other devices have employed linkage arrangements wherein the cover panel is linked to the base panel by a multi-axis hinge array. Such arrangements, however, also have again required unduly complex hinge manipulations, and have made opening and closing of the device awkward due to independent operation of the hinges.

What is needed is a linkage arrangement which allows for controlled opening and closing of a clamshell-like device without requiring complex user manipulations. It thus would be desirable to provide a hinge arrangement having first and second hinges wherein a controlled handoff of pivot operation from one hinge to another is achieved. More particularly, it would be desirable to provide a multi-axis hinge arrangement having first and second spaced hinges wherein pivot of at least one of such hinges is automatically restricted at any given time.

DISCLOSURE OF THE INVENTION

The present invention addresses the aforementioned problems by provision of a hinge arrangement having first and second hinges, each of which is operable upon application of a different torque. The first hinge operates upon application of a first torque to pivot a structure through a first range of motion, beyond which the first hinge is opposed by a relatively high restrictive force. The second hinge operates upon application of a second torque which is greater than the first torque, but insufficient to overcome the restrictive force. Upon applying the second torque, the structure is pivotable through a second range of motion, the second range of motion typically following the first range of motion. The hinges thus work cooperatively to pivotally couple first and second panels (or structures) of a clamshell-like device.

The hinges preferably are mounted on an intermediate linkage element, defining a pair of spaced-apart pivot axes. The first hinge pivotally connects the first panel to the linkage element to define a first hinge axis, and the second hinge pivotally connects the second structure to the linkage element to define a second hinge axis. Due to the differing torques required to operate the hinges, it will be understood that the second hinge is fixed during operation of the first hinge, and the first hinge is fixed during operation of the second hinge. Correspondingly, the linkage element is fixed relative to the second panel during operation of the first hinge and is fixed relative to the first panel during operation of the second hinge. This enables controlled pivot of the first panel relative to the second panel substantially throughout 360-degrees of rotation without requiring manual adjustment of the linkage element.

These and additional objects and advantages of the present invention will be more readily understood after a consideration of the drawings and the detailed description which follows.

DETAILED DESCRIPTION OF THE PREFERRED EMBODIMENT AND BEST MODE FOR CARRYING OUT THE INVENTION

Figure 1:
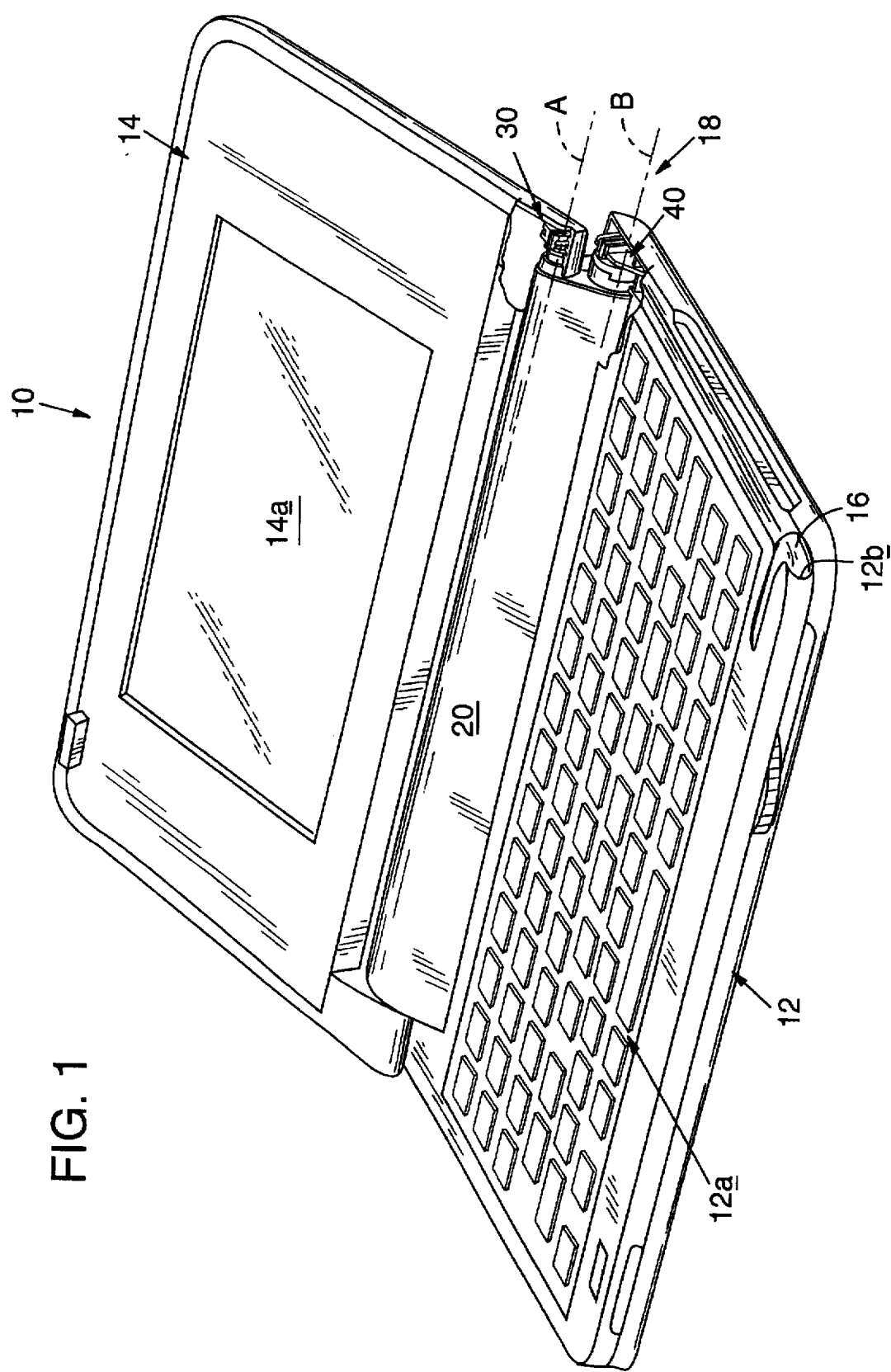
FIG. 1 is an isometric view of a handheld computer organizer which is partially broken-away to depict a hinge arrangement constructed in accordance with a preferred embodiment of the invention.

FIG. 1 shows, at 10, a handheld computer organizer having a base panel 12 and a cover panel 14. As indicated, base panel 12 defines a keyboard 12a, such keyboard being configured in accordance with a standard computer keyboard of the type well known in the art. The base panel also defines a cavity 12b configured to receive a stylus 16 which takes the form generally of a pen. Cover panel 14, it will be noted, defines a display screen 14a which is configured to accept input from the pen-like stylus, allowing a user to draw images on the display screen.

Figure 2A:
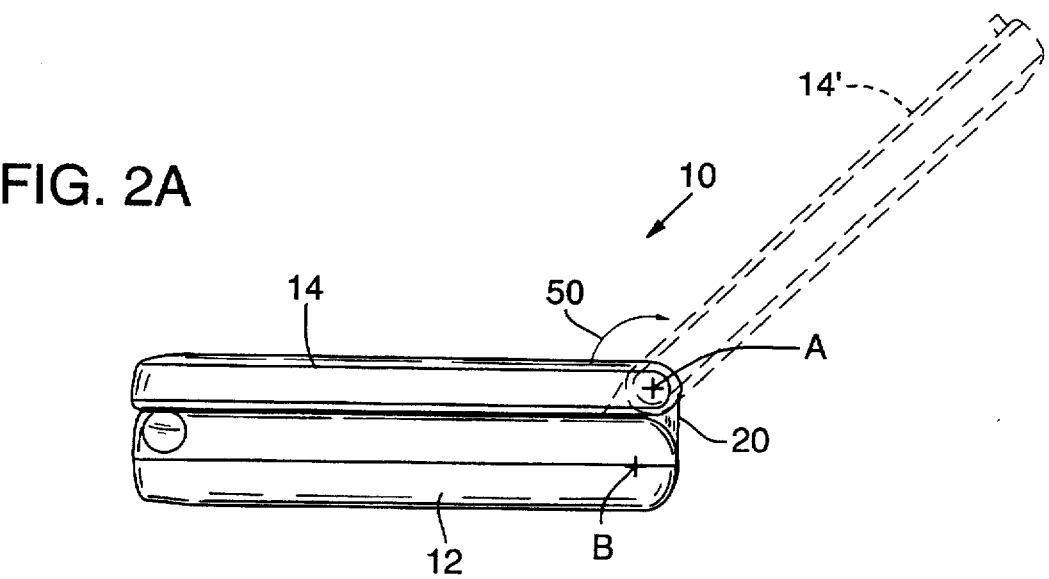
FIGS. 2A-2C are side view drawings of the handheld computer organizer depicted in FIG. 1, such drawings illustrating pivot of a cover panel relative to a base panel substantially throughout 360-degrees of rotation.
Figure 2B:
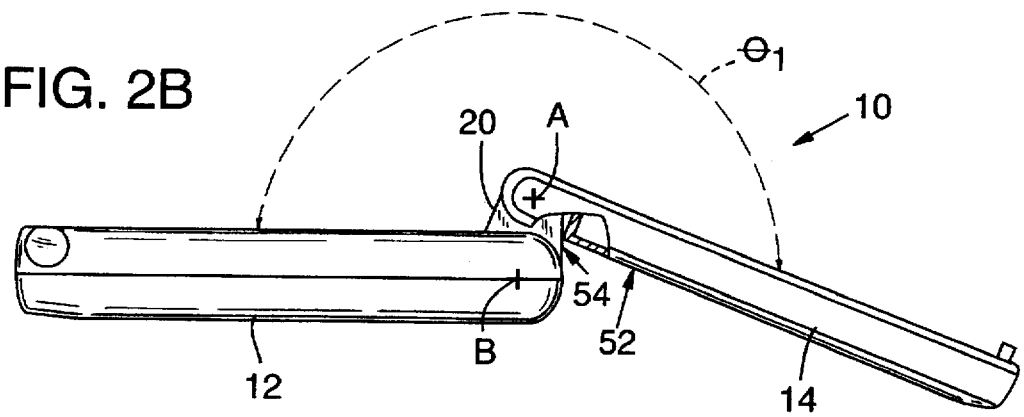
Figure 2C:
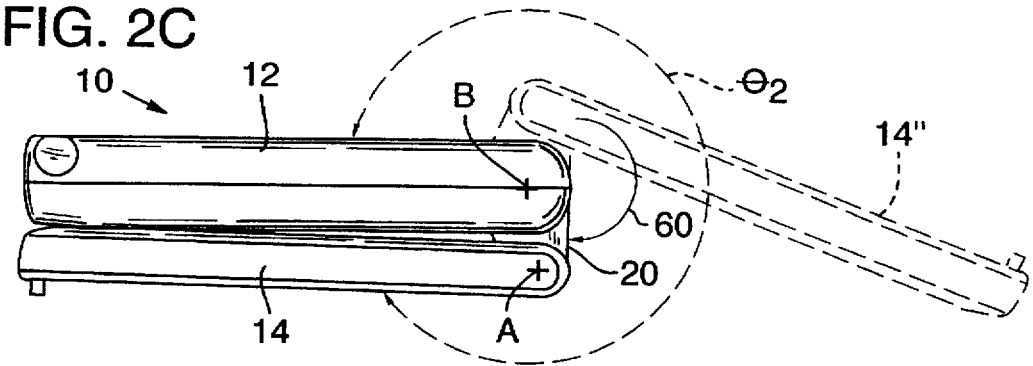

Organizer 10 is useful in various configurations, it being possible to enter and retrieve data using either the keyboard, the display screen, or both. The organizer thus is embodied in clamshell-like device, meaning that the cover panel and base panel pivot relative to one another so as to open or close the device. FIGS. 2A–2C, for example, illustrate pivot of the cover panel from a fully-closed orientation (FIG. 2A) to a fully-open orientation (FIG. 2C), various intermediate orientations being shown in dashed lines. This is achieved via a hinge arrangement 18 which pivotally couples the base and cover panels in a manner which will now be described.

As indicated in FIG. 1, hinge arrangement 18 includes a linkage element 20 which connects the base and covey panels via a pair of hinges so as to enable opening and closing of the device. A first hinge 30 pivotally connects the linkage element to the cover panel to define a first hinge axis A. A second hinge 40 pivotally connects the linkage element to the base panel to define a second hinge axis B. The two hinge axes are spaced from one another in order to accommodate pivot of the cover panel relative to the base panel substantially throughout 360-degrees of rotation.

Referring to FIGS. 2A–2C, it will be understood that cover panel 14 pivots relative to base panel 12 using both the first and second hinges, but that the first hinge operates only during a first range of motion of the cover panel and the second hinge operates only during a second range of motion of the cover panel. When opening the device, the second range of motion directly follows the first range of motion, meaning that at least one of the first and second hinges is restricted at any given time. Correspondingly, only the first hinge, or the second hinge, operates at any one time. Those skilled will appreciate, of course, that the terms first hinge and second hinge are used broadly herein to refer either to a single hinge, or to a series of hinges which define a single hinge axis.

To open the device, cover panel 14 initially is pivoted about first axis A via first hinge 30, linkage element 20 remaining fixed relative to base panel 12. If the user wishes to use the organizer as a desktop computer, the cover panel is pivoted to the "landscape orientation" shown at 14'. If the user wishes to use the organizer as a note pad, pivot continues through the first range of motion as indicated by arrow 50. Upon reaching a predetermined intermediate open orientation (FIG. 2B), cover panel 14 will engage linkage element 20 so as to oppose further pivot of the cover panel about first axis A. In the depicted embodiment, an exterior cover panel surface 52 engages an exterior linkage element surface, 54, surface 54 acting as a hard stop. This effectively defines a limit on the first range of motion of the cover panel at pivot angle $\theta_1$. The other limit is defined at a pivotal angle of 0-degrees where the device is fully-closed. Thereafter, the linkage element and cover panel pivot together about second axis B (as illustrated by arrow 60 in FIG. 2C). The cover panel and linkage element pivot through a second range of motion to the "portrait orientation" where the cover panel is folded back against the base panel. One limit of the second range of motion corresponds to a limit of the first range of motion as shown in FIG. 2C at 14". The other limit is the fully-open orientation where the cover panel engages the base panel as also shown in FIG. 2C. The cover panel thus will be seen to pivot an angle $\theta_2$ relative to the base panel, $\theta_2$ representing pivot substantially throughout 360-degrees of rotation. The device then may be turned over so that the display screen may be used as a note pad.

Correspondingly, when closing the device from the fully-open orientation of FIG. 2C, the cover panel initially is pivoted together with the linkage element about second axis B through the previously-identified second range of motion. Upon reaching the intermediate open orientation, the linkage element automatically is locked in place to prevent further pivot thereof. The cover panel, however, continues to pivot about the first axis A through the previously-identified first range of motion until it reaches the fully-closed orientation shown in FIG. 2A. It thus will be appreciated that first hinge 30 is operable during pivot within the first range of motion of the cover panel, and second hinge 40 is operable during pivot within the second range of motion of the cover panel. This is achieved by employing hinges with differing torque characteristics, the first hinge being operable upon achieving a first torque $T_1$ and the second hinge being operable upon achieving a second torque $T_2$ which is greater than the first torque.

Figure 3:
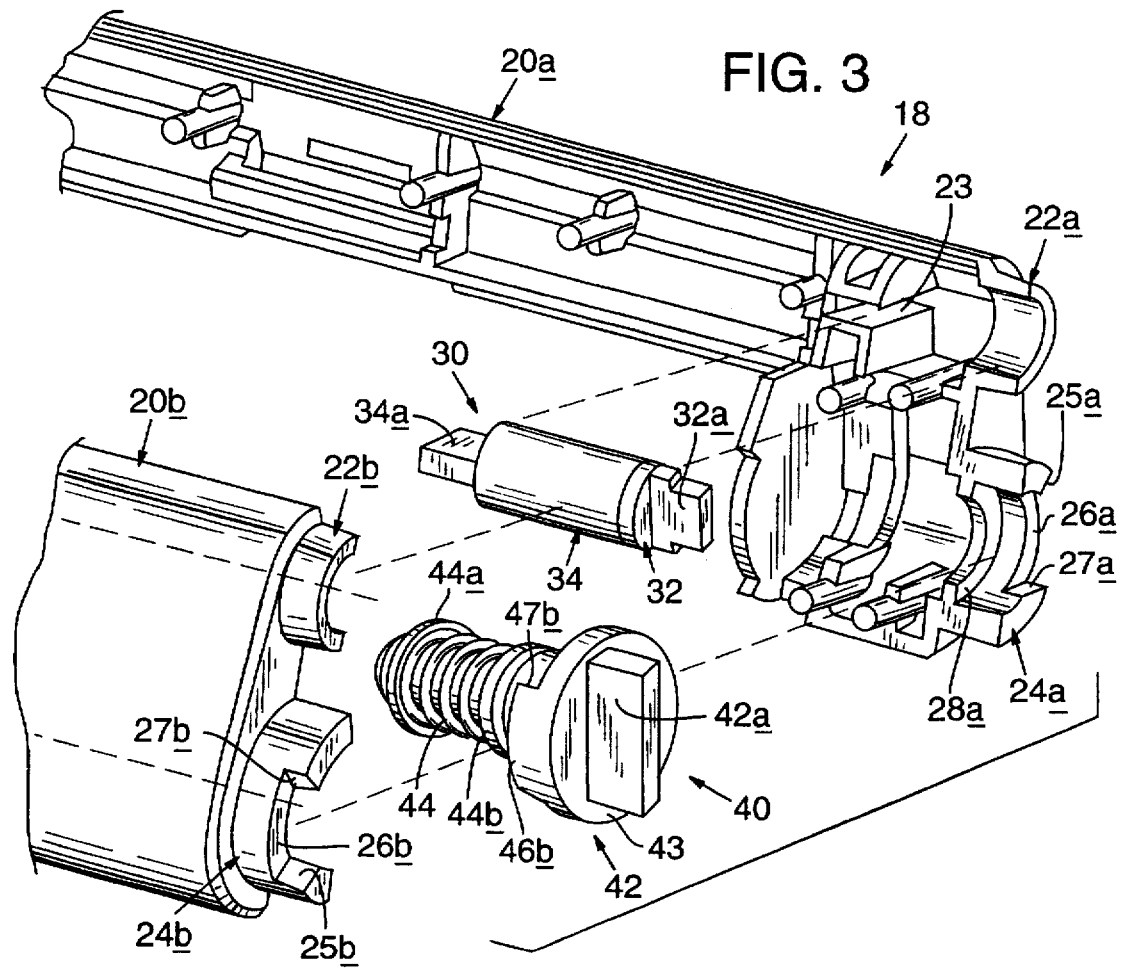
FIG. 3 is an enlarged and exploded isometric view of the preferred embodiment hinge arrangement, such hinge arrangement including first and second hinges which operate in connection with a linkage element.
Figure 4:
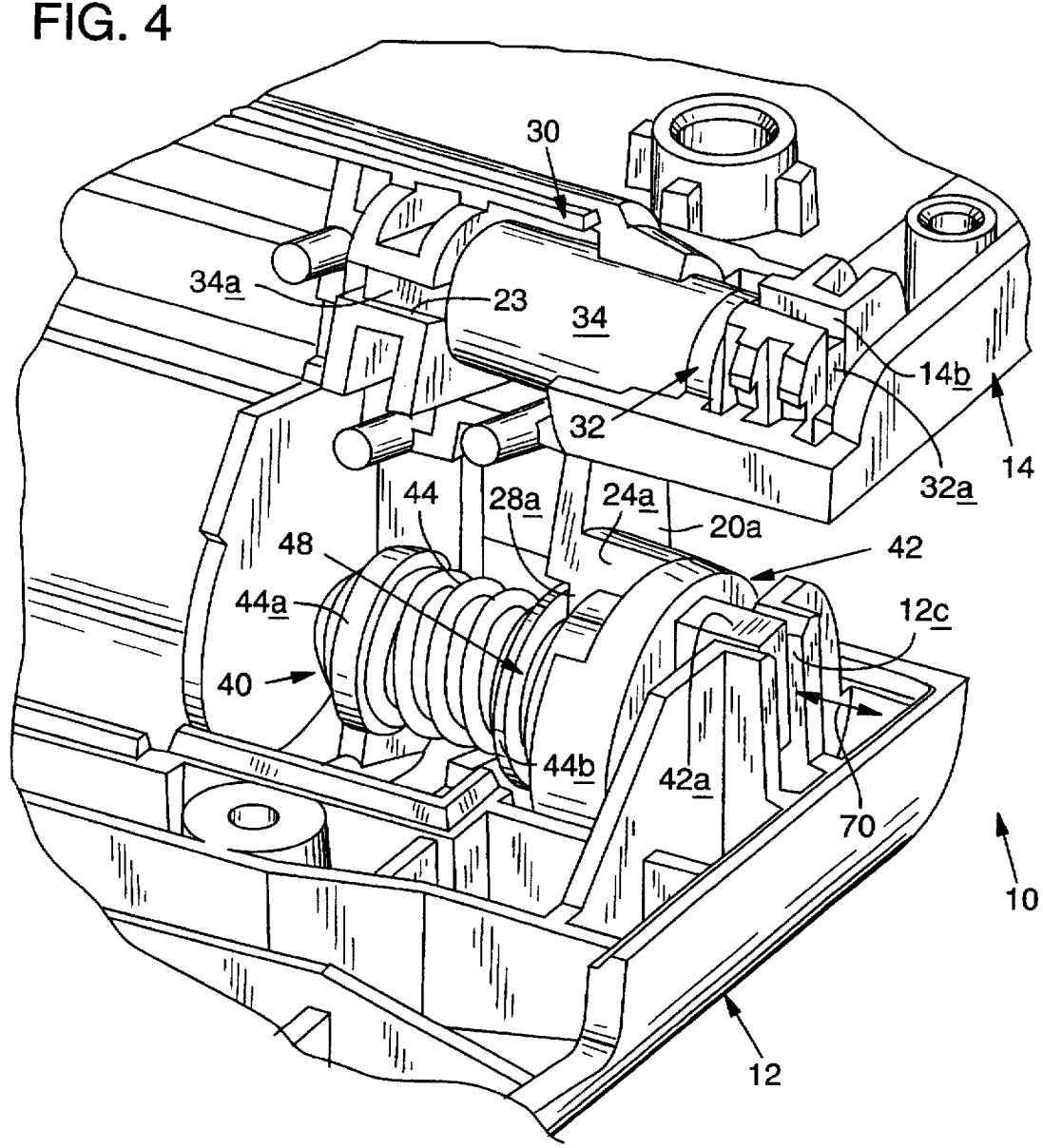
FIG. 4 is a further enlarged and fragmented isometric view of the computer organizer of FIG. 1, the preferred embodiment hinge arrangement being shown in detail.

Operation of the hinge arrangement will be more fully described in reference to FIG. 3 which shows hinge arrangement 18 in exploded isometric view, and FIG. 4 which shows the assembled hinge arrangement in detail. As indicated, linkage element 20 is a two-piece construction, such pieces coming together to capture first hinge 30 and second hinge 40, and thereby to define a cooperative hinge arrangement whereby fluid opening and closing of the organizer may be achieved. The linkage element includes a back piece 20a and a front piece 20b, each configured specially for combination with the other. The back piece, for example, defines an upper socket portion 22a and a lower socket portion 24a which combine with an upper socket portion 22b and a lower socket portion 24b of the front piece to provide upper and lower hinge sockets. The upper hinge socket seats first hinge 30. The lower hinge socket seats second hinge 40.

Each hinge socket is configured to allow pivot of its hinge about a corresponding hinge axis, but the lower hinge socket also defines locking mechanism whereby pivotal operation of the second hinge may be opposed. Lower socket portion 24a thus will be seen to define a first notch having a floor 26a, and lower socket portion 24b will be seen to define a second notch having a floor 26b. The first notch has opposite side walls 25a, 27a. The second notch similarly has opposite side walls 25b, 27b. Side walls 27a, 27b are generally perpendicular to respective notch floors. Side walls 25a, 25b are at obtuse angles relative to respective notch floors so as to enable cammed engagement with corresponding cammed locking tabs as will be described below.

Referring now to first hinge 30, it will be noted that such hinge includes a shaft 32 mounted in a housing 34. Housing 34 includes a frictional bushing (not shown) which opposes pivot of shaft 32 with a substantially constant frictional force. Shaft 32 thus is rotatable within housing 34 only upon achieving a corresponding first torque $T_1$ which overcomes the opposition of the frictional bushing. Typically, shaft 32 rotates under a first torque $T_1$ of approximately 11.2–16.0 Newton-millimeters.

Shaft 32 includes a tab 32a configured for receipt within a slot 14b of cover panel 14 (FIG. 4), effectively fixing shaft 32 relative to cover panel 12. Housing 34 includes a tab 34a configured for receipt within a corresponding slot 23 of linkage element back piece 20a. This effectively fixes housing 34 relative to linkage element 20. First hinge 30 thus is operable upon application of a torque $T_1$ to pivot the cover panel relative to the linkage element through a first range of motion. The linkage element, however, nominally is fixed relative to the base panel until application of a second torque $T_2$ (greater than first torque $T_1$) which is capable of releasing the locking mechanism of second hinge 40. Correspondingly, the cover panel nominally pivots relative to the base panel through a first range of motion defined oppositely by the fully-closed orientation (FIG. 2A) and the intermediate open orientation (FIG. 2B). Torque $T_2$ typically will not be applied where pivot may be achieved under a first torque $T_1$, as during the first range of motion.

Turning now to second hinge 40, it will be seen that the second hinge includes a pintle 42 having a tab 42a which seats within a slot 12c of base panel 12 (FIG. 4). This effectively fixes the pintle relative to the base panel. Pintle 42 also seats within a socket defined by lower socket portions 24a, 24b, but such seat is releasably lockable to provide for pivot of the linkage element relative to the base panel upon application of a second torque $T_2$. The pintle is mounted in the socket via an annular rib of the linkage element (a portion of which is shown at 28a), such rib being configured to fit within a corresponding annular channel 48 of pintle 42. A helical spring 44 extends along the pintle between a fixed washer 44a and a related floating washer 44b. Washer 44b defines one wall of annular channel 48. The other wall is defined by the contour of pintle 42. The channel thus may be altered (i.e., widened) upon overcoming the bias of helical spring 44.

Figure 3A:
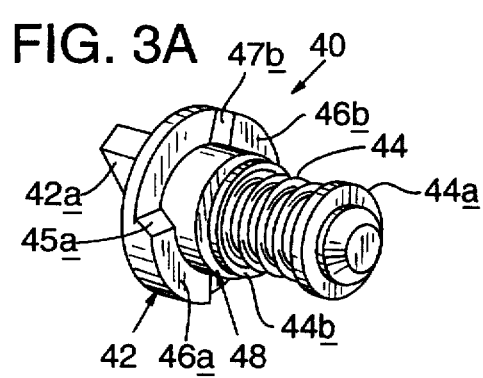
FIGS. 3A and 3B are isometric views of one of the hinges shown in FIG. 3, such hinge being illustrated from differing perspectives.
Figure 3B:
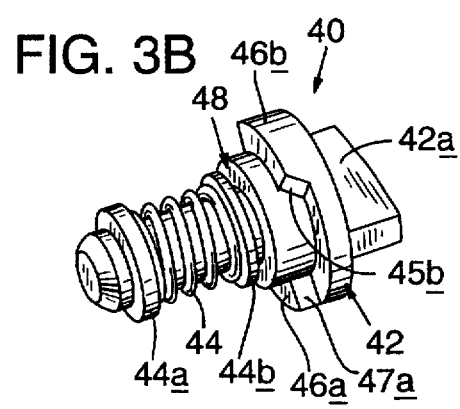

Pintle 42 also includes a head 43 from which extends a pair of cammed locking tabs 46a, 46b which matingly fit into corresponding notches of linkage element 20. Locking tabs 46a, 46b are shown in detail in FIGS. 3A and 3B which depict the second hinge from differing perspectives. As indicated therein, each locking tab defines a side wall 47a, 47b which is generally perpendicular to the corresponding locking tab's floor-contacting surface, and a side wall 45a, 45b which is at an obtuse angle relative to the corresponding locking tab's floor-contacting surface so as to enable cammed engagement with a corresponding notch side wall.

In its nominal orientation, pintle 42 is locked relative to the linkage element, the pintle being biased (via helical spring 44) toward a locked position where locking tabs 46a, 46b fit within corresponding notches of the linkage element's lower socket. It is to be noted, however, that due to the cammed relationship between the locking tabs and the notches, it is possible to overcome the spring bias by applying a second torque $T_2$ to the pintle (indicated by arrow 60 in FIG. 2C). Second torque $T_2$ typically is at least twice torque $T_1$, and preferably is 30–32 Newton-millimeters. This second torque causes the locking tabs to cammingly disengage the notches, the locking tabs riding up cammed side walls 25a, 25b and onto the exterior surfaces of the lower socket. Pintle 42 thus is movable laterally as indicated at 70 in FIG. 4. Thereafter, the locking tabs ride along the exterior surfaces, the primary opposition to such rotation coming from frictional forces therebetween. The pintle then rotates under a torque $T_3$ which is less than both $T_2$ and $T_1$.

The first hinge thus operates upon application of a first torque to the cover panel pivot the cover panel through a first range of motion, beyond which the first hinge is opposed by a relatively high restrictive force. The second hinge operates upon similar application of a second torque which is greater than the first torque, but insufficient to overcome the restrictive force. Upon applying the second torque, the cover panel pivots through a second range of motion, the second range of motion typically following the first range of motion.

Due to the differing torques required to operate the hinges, it will be understood that the second hinge is fixed during operation of the first hinge, and the first hinge is fixed during operation of the second hinge. Correspondingly, the linkage element is fixed relative to the base panel during operation of the first hinge and is fixed relative to the cover panel during operation of the second hinge. This enables controlled pivot of the first panel relative to the second panel substantially throughout 360-degrees of rotation without requiring manual adjustment of the linkage element.

INDUSTRIAL APPLICABILITY

The invented hinge arrangement thus will be seen to greatly improve opening and closing of a clamshell-like device such as a handheld computer organizer. To open the device, it is necessary only to pivot the cover panel relative to the base panel, the required torques to pivot the hinges during different phases of rotation be selected-to automatically handoff hinge operation from one hinge to another in accordance with predetermined criteria. A first hinge will operate under a torque $T_1$ during a first range of motion of the cover panel, beyond which an opposing force in the form of a hard stop will be encountered. Thereafter, a second hinge will operate upon application of a second torque $T_2$. After the locking mechanism has been disengaged, the second hinge will operate under a third torque $T_3$ through the second range of motion.

While the present invention has been shown and described with reference to the foregoing operational principles and preferred embodiment, it will be apparent to those skilled in the art that other changes in form and detail may be made therein without departing from the spirit and scope of the invention as defined in the appended claims. For example, although the hinge arrangement is described above in the context of a handheld computer organizer, it will be understood that the invention is not so limited, the claimed hinge arrangement demonstrating utility in virtually any device where a first structure is to be pivoted relative to a second structure.

We claim:

1. A hinge arrangement for use in pivoting a first structure relative to a second structure, said hinge arrangement comprising:

a first hinge which operatively couples the first structure with the second structure, said first hinge being operable under a first torque to pivot the first structure relative to the second structure through a first range of motion, beyond which operation of said first hinge is opposed by a restrictive force; and a second hinge which operatively couples the first structure with the second structure, said second hinge including a pintle and a socket, said pintle having a cammed locking tab configured to frictionally engage a corresponding notch of said socket so as to releasably lock said pintle relative to said socket, said second hinge being operable upon application of a second torque which is greater than said first torque, but insufficient to overcome said restrictive force, so as to pivot said pintle to disengage said cammed locking tab from said notch and thereby to provide for pivot of the first structure relative to the second structure through a second range of motion via said second hinge.

2. The hinge arrangement of claim 1, wherein said second hinge is pivotally fixed during operation of said first hinge, and said first hinge is pivotally fixed during operation of said second hinge.

3. The hinge arrangement of claim 2 which further comprises a linkage element coupled with said first and second hinges, said first hinge pivotally connecting the first structure to said linkage element to define a first hinge axis, and said second hinge pivotally connecting the second structure to said linkage element to define a second hinge axis.

4. The hinge arrangement of claim 3, wherein said linkage element is fixed relative to said second structure during pivot of said first hinge and is fixed relative to said first structure during pivot of said second hinge.

5. The hinge arrangement of claim 3, wherein said first and second hinge axes are spaced from one another to enable pivoting of said first structure relative to said second structure substantially throughout 360-degrees of rotation.

6. The hinge arrangement of claim 1 which further comprises a stop operatively engageable by said first structure, said stop providing said restrictive force to limit pivot of said first hinge in accordance with said first range of motion.

7. The hinge arrangement of claim 1, wherein said second torque is approximately twice said first torque.

8. The hinge arrangement of claim 1, wherein a difference between said first torque during said first range of motion and said second torque during said second range of motion identifies an intermediate open orientation of said first structure relative to said second structure.

9. The hinge arrangement of claim 1, wherein said second hinge is pivotable under a third torque upon disengagement of said cammed locking tab from said notch, said third torque being less than said first torque, less than said second torque and less than said restrictive force.

10. A hinge arrangement for use in pivoting a cover panel relative to a base panel, said hinge arrangement comprising:

a linkage element intermediate the cover panel and the base panel;

a first hinge which pivotally couples the cover panel with said linkage element, said first hinge including a shaft, a shaft housing and an intermediate frictional bushing which provides substantially continuous frictional opposition to pivot of said shaft relative to said shaft housing, said first hinge being operable under a first torque to pivot the cover panel relative to said linkage element through a first range of motion, said linkage element being substantially fixed relative to said base panel during operation of said first hinge; and a second hinge which pivotally couples said linkage element with the base panel, said second hinge including a pintle which is fixed relative to said base panel and a socket which is fixed relative to said linkage element, said pintle having a cammed locking tab configured to frictionally engage a corresponding socket so as to releasably lock said pintle relative to said socket, and thereby to releasably lock said linkage element relative to said base panel, said linkage element being released upon application of a second torque to said linkage element whereby said cammed locking tab is cammingly disengaged from said socket, said second hinge being operable upon applying a second torque which is greater than said first torque to pivot said linkage element relative to the base panel through a second range of motion, said linkage element being fixed relative to said cover panel during operation of said second hinge.

11. The hinge arrangement of claim 10, wherein said cammed locking tab is biased toward locking engagement with said socket.

12. The hinge arrangement of claim 10, wherein pivotal operation of said second hinge is achieved under a third torque upon disengagement of said cammed locking tab from said notch, said third torque being less than both said first and second torques.

13. The hinge arrangement of claim 10, wherein said second torque is approximately twice said first torque.

14. The hinge arrangement of claim 10, wherein a difference between said first torque during said first range of motion and said second torque during said second range of motion identifies a intermediate open orientation of said cover panel relative to said base panel.

15. A clamshell-like device including a cover panel, a base panel, and a hinge arrangement for use in cooperatively pivoting the cover panel relative to the base panel, said hinge arrangement comprising:

a linkage element intermediate the cover panel and the base panel;

a first hinge pivotally coupling the cover panel with said linkage element, said first hinge being operable under a first torque to pivot the cover panel relative to said linkage element through a first range of motion extending between a fully closed orientation of the cover panel relative to the base panel and an intermediate open orientation of the cover panel relative to the base panel where said cover panel engages a stop, said linkage element being fixed relative to said base panel during operation of said first hinge; and a second hinge pivotally coupling said linkage element with the base panel, said second hinge including a pintle and a socket, said pintle having a cammed locking tab configured to frictionally engage a corresponding notch of said socket so as to releasably lock said pintle relative to said socket, said second hinge being operable upon applying a second torque which is greater than said first torque to pivot said pintle to disengage said cammed locking tab from said notch, and thereby to permit pivot of said linkage element relative to the base panel through a second range of motion extending between said intermediate open orientation of the cover panel relative to the base panel and a fully open orientation of the cover panel relative to the base panel, said linkage element being fixed relative to said cover panel during operation of said second hinge.

16. The clamshell-like device of claim 15, wherein said first and second hinges are spaced from one another to define spaced-apart first and second pivot axes, thereby enabling pivoting of said cover panel relative to said base panel substantially throughout 360-degrees of rotation.

* * * * *